United States Patent [19]
Mason

[11] 3,987,354
[45] Oct. 19, 1976

[54] REGULATING CIRCUIT

[76] Inventor: William B. Mason, 706 E. Mitchell, Arlington, Tex. 76010

[22] Filed: Apr. 25, 1975

[21] Appl. No.: 571,637

[52] U.S. Cl. ............................. 320/39; 320/DIG. 2; 323/4; 323/22 SC
[51] Int. Cl.² ...................... H02J 7/10; H02M 1/08
[58] Field of Search .................. 320/31, 32, 39, 40, 320/DIG. 2; 323/22 SC, 4

[56] References Cited
UNITED STATES PATENTS

| | | | |
|---|---|---|---|
| 3,382,425 | 5/1968 | Legatti | 320/DIG. 2 X |
| 3,504,269 | 3/1970 | Hallahan, Jr. | 320/DIG. 2 X |
| 3,887,858 | 6/1975 | Burkett et al. | 320/39 X |

*Primary Examiner*—J D Miller
*Assistant Examiner*—Robert J. Hickey
*Attorney, Agent, or Firm*—Giles C. Clegg, Jr.

[57] ABSTRACT

A regulator circuit provides a constant direct current to a load, for example, a string of batteries. The current is regulated to be independent of the load and supply voltage variations and can be operated under open or short circuited load conditions for an indefinite time without damage. The generator includes a pair of SCRs in a full wave current supply which provide phase angle controlled current through the load and a sensing resistor in series therewith. The voltage drop across the resistor, which is proportional to the output current of the generator, is averaged by an RC network and compared with a reference voltage to develop an error signal which is amplified and conditioned to control the firing angle of the SCRs. Additionally, the regulator functions to supply a constant voltage output across the resistor.

9 Claims, 3 Drawing Figures

REGULATING CIRCUIT

BACKGROUND OF THE INVENTION

1. Field of the Invention

The present invention relates to constant current generators and, more particularly, to a constant current generator for supplying a constant charging current to a load, for example, a battery or a string of batteries.

2. Technical Considerations

Battery charging circuits of the type which provide a constant charging current to a battery load are well known in the art. When they are powered through commercially available power sources, such as standard 120 v 60 hz electrical energy supplied by a public utility, variations in the supply voltage tend to effect adversely the current output of the battery charging circuit.

Additionally, wide variations in the battery terminal voltage and impedance can effect the output of the charging circuit such that it will not deliver its nominally rated direct current.

SUMMARY OF THE INVENTION

One object of the present invention is to provide a new and improved circuit for supplying a constant charging current to a load.

Another object of the present invention is to provide a new and improved circuit for supplying a constant direct charging current to a load, wherein the current is independent of the load.

Another object of the present invention is to provide a new and improved circuit for supplying a constant charging current to a load wherein the circuit may be operated under open or short circuited load conditions without damage.

Another object of the present invention is to provide a new and improved circuit for supplying a constant charging current to a load including means for regulating the charging current to within one per cent of its nominal value.

Another object of the invention is to provide a new and improved battery charging circuit which meets all of the above objects.

With these and other objects in view, a circuit for supplying a constant charging current to a battery load, in accordance with the principles of the present invention, may include first and second terminals for connecting to an a.c. source, third and fourth terminals for connecting to the load, full wave rectifier means connected across the first and second terminals, first and second controlled switching devices, each having first and second power electrodes and a control electrode, the first and second controlled switching devices being connected with their power electrodes in series opposition across the first and second terminals, means connecting the third terminal between the first and second controlled switching devices, means for connecting resistance means between the fourth terminal and the full wave rectifier means for developing a first voltage proportional to the current through the load, means coupled to the full wave rectifier means for developing a predetermined second voltage, pulse generating means coupled to the output of the full wave rectifier means and to control electrodes of the controlled switching devices for applying trigger pulses thereto, and means responsive to the difference between the first and second voltages for controlling the pulse generating means.

The controlled switching devices are preferably silicon controlled rectifiers which are alternately forward biased during successive half-cycles of source voltage. The pulse generating means includes a capacitor connected through a breakdown switching device to the primary winding of a pulse transformer having two secondary windings in the gate triggering circuits of the silicon controlled rectifiers which are pulsed by the capacitor which discharges through the breakdown switching device and the primary winding of the pulse transforner.

Line synchronization means are provided to insure that the capacitor is fully discharged at the beginning of each half cycle of applied voltage. The charging rate of the capacitor is controlled by the charge on a second capacitor which follows the difference between the compared voltages. This provides rectified phase angle controlled current from the silicon controlled rectifiers to provide a current through the load which has a constant predetermined average value.

BRIEF DESCRIPTION OF THE DRAWINGS

A complete understanding of the present invention may be obtained from the following detailed description thereof when read in conjunction with the accompanying drawings, wherein.

DETAILED DESCRIPTION

Figure 1:
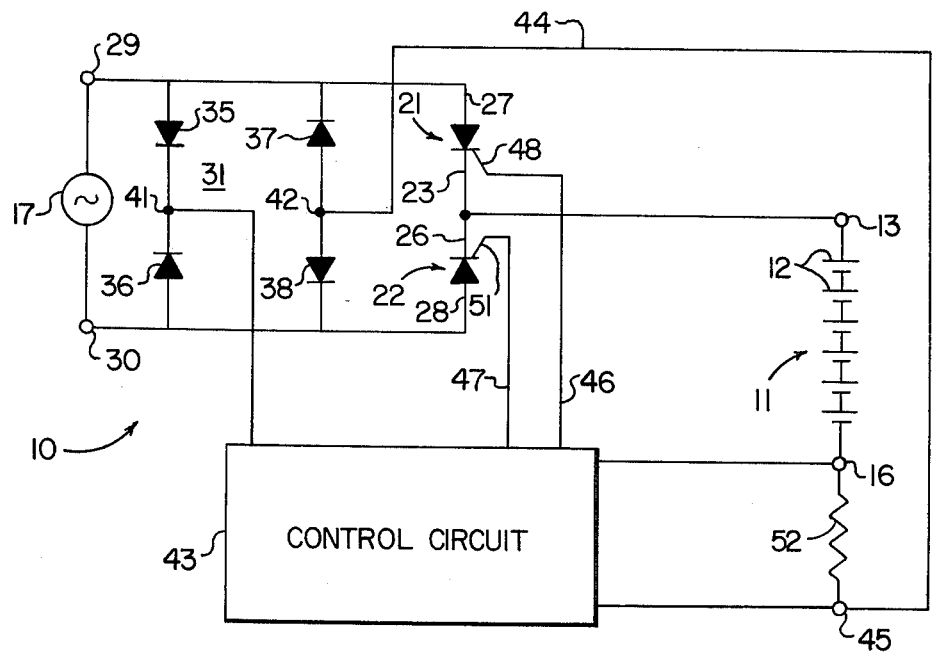
FIG. 1 is a schematic diagram, partially in block form, of a constant current generator circuit in accordance with the principles of the present invention.

Referring to FIG. 1, there is shown a constant current charging circuit 10 for providing a constant direct current of a predetermined value, for example, four amperes, to a load 11, which may be, for example, a string of batteries 12—12 connected in series across a pair of output terminals 13 and 16. As illustrated in FIG. 1, the circuit 10 is a battery charger. Each battery 12 may be a 12-volt battery and the load 11 may contain six such batteries 12—12 connected in series aiding relationship with the positive terminal of the first battery 12 in the series connected to the output terminal 13 and the negative terminal of the last battery 12 in the series connected to the terminal 16.

A positive constant current leaving the terminal 13 is regulated to be independent of the terminal voltages of the batteries 12—12 and is also independent of voltage variations at a source 17, which is preferably 120v 60hz supplied, for example, by an electric utility. The circuit 10 may be operated either open or short circuited for an indefinite period of time without damage.

The circuit 10 employs first and second silicon controlled rectifiers (SCRs) 21 and 22 having their cathode terminals 23 and 26, respectively, connected to the output terminal 13 and their anode terminals 27 and 28, respectively, connected to a pair of source terminals 29 and 30, across the input of a full wave rectifier 31 which is of the conventional bridge type including four diodes 35–38. A pair of output terminals 41 and 42 of the full wave rectifier 31 are connected to a control circuit 43. The terminal 42 is connected to the control circuit 43 through a line 44 connected to an input terminal 45 of the control circuit 43, which has first and second output leads 46 and 47, respectively, connected to a gate electrode 48 and a gate electrode 51 of the SCRs 21 and 22, respectively.

During alternate half cycles of source voltage, the SCRs 21 and 22 are alternately forward biased. During each half cycle, firing angle control pulses are supplied to both gate electrodes 48 and 51 from the output leads 46 and 47 of the control circuit 43. In this manner the SCRs 21 and 22 are alternately triggered to supply rectified phase angle controlled current from the source 17 to the output terminal 13 of the circuit 10 to continuously supply a d.c. average current of a predetermined value to the load 11.

The current through the load 11 is sensed as a voltage drop across a resistor 52 in series with the load and having a relatively small value, for example, three ohms. The voltage drop across the resistor 52 is proportional to the current through the load 11. It is therefore apparent that the current may be regulated to keep the current through resistor 52 constant and therefore provide a regulated voltage output across resistor 52. The voltage across resistor 52 is averaged out by the control circuit 43 and compared with an internally generated reference voltage in the control circuit 43. The error signal developed therein is amplified and conditioned to control the conduction angle of the SCRs 21 and 22 and thus to control the current through the load 11.

Figure 3:
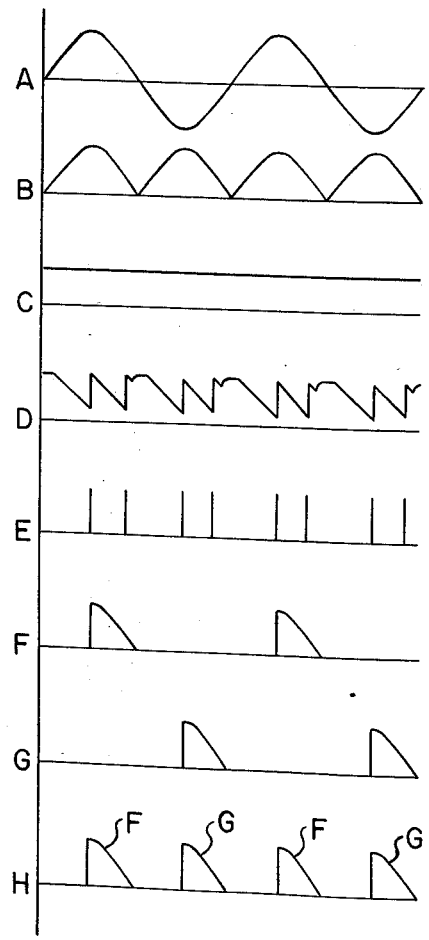
FIG. 3 illustrates a plurality of waveforms helpful in understanding the operation of the circuit of FIG. 2.
Figure 2:
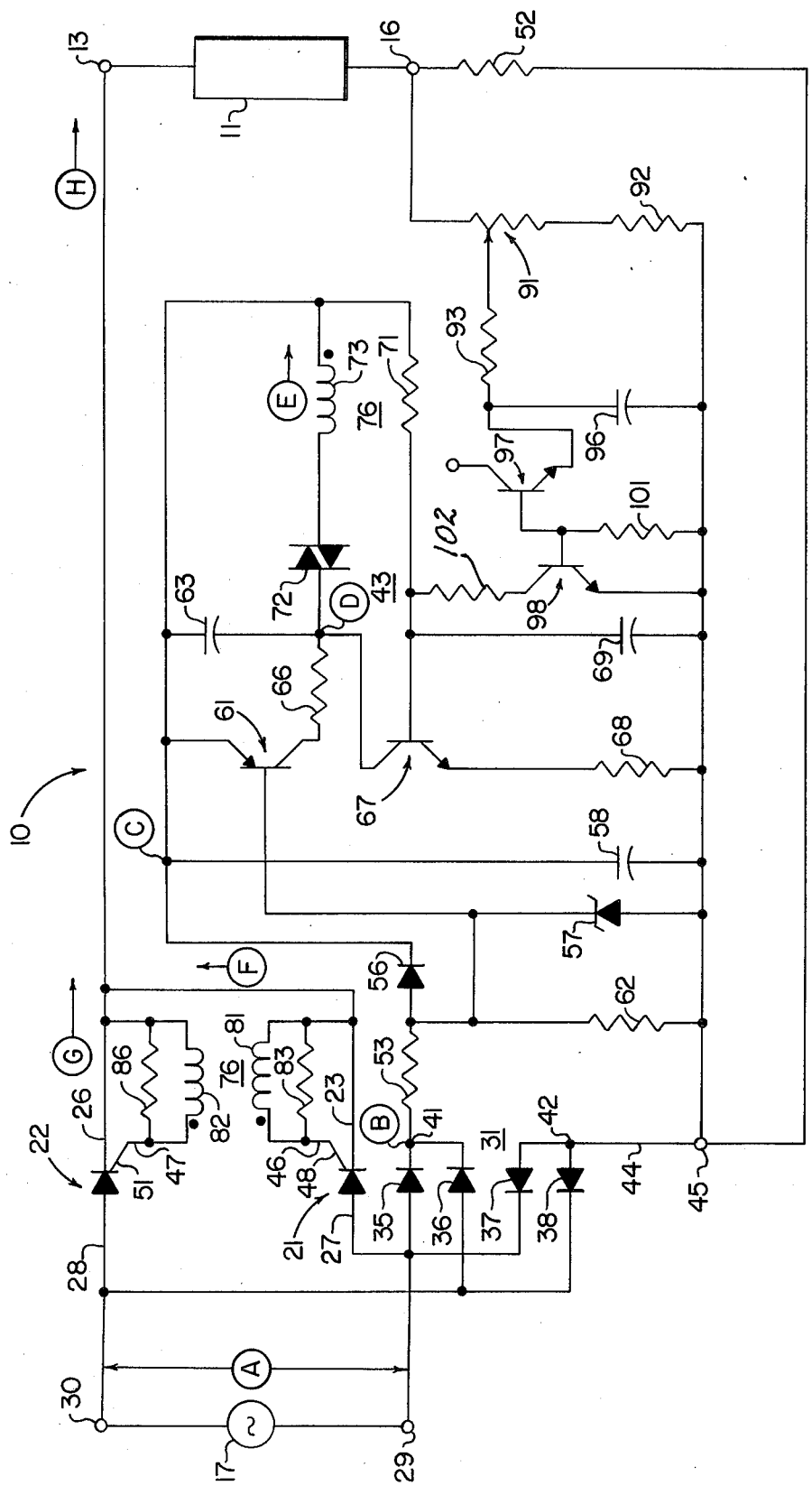
FIG. 2 is a detailed schematic diagram of the circuit of FIG. 1.

Referring to FIGS. 2 and 3, the input voltage (FIG. 3A) appears as a rectified voltage (FIG. 3B) across the output terminals 41 and 42 of the full wave rectifier 31. The terminal 42 is the reference terminal for the voltage waveforms shown in FIGS. 3A–D unless otherwise shown. The rectified current at the terminal 41 is passed through a current limiting resistor 53 and a forward biased diode 56. A reverse biased Zener diode 57 is connected between the junction of the resistor 53 and the diode 56 and the output terminal 42 of the full wave rectifier 31 to regulate the rectified voltage. A filter capacitor 58 connected across the diode 56 and the Zener diode 57 smooths the rectified and regulated voltage (FIG. 3C).

A PNP transistor 61 is connected with its base-emitter junction across the diode 56 and its base connected to a resistor 62 in parallel with the Zener diode 57. A capacitor 63 is connected across the output of the transistor 61 through a current limiting resistor 66. The capacitor 63 is also connected in the collector-emitter circuit of an NPN transistor 67, in series with a resistor 68 connected to the output terminal 42 of the full wave rectifier 31. The base of the transistor 67 is connected to the terminal 42 through a filter capacitor 69 and to the junction between the diode 56 and the capacitor 58 through a resistor 71.

The capacitor 63 is connected across the series combination of a silicon bidirectional switch (SBS) 72 and a primary winding 73 of a pulse transformer 76.

The pulse transformer 76 includes first and second secondary windings 81 and 82, respectively, forming part of the gating circuits of the SCRs 21 and 22 along with parallel resistors 83 and 86, respectively.

The capacitor 63, the SBS 72 and the pulse transformer 76 comprise a gate trigger pulse generator. During each half cycle of supply voltage, current through the transistor 67, which is a voltage controlled sink transistor, charges the capacitor 63 to the switching voltage of the SBS 72 which switches from a blocking or non-conductive state to a conductive state, discharging capacitor 63 (FIG. 3D) through the primary winding 73 of the pulse transformer 76. These voltage pulses (FIG. 3E) are coupled to the gate circuits of the SCRs 21 and 22 causing the SCR which is forward biased at the time the transformed pulse occurs, to conduct as shown in FIGS. 3F and 3G, to supply current to the load 11 (FIG. 3H).

The capacitor 63 must be discharged at the beginning of each half cycle of applied voltage since any residual charge on capacitor 63 would affect the switching time of the SBS 72. The circuit 10 insures this through a line synchronization means comprising the diode 56, the resistor 62 and the transistor 61.

When the full wave rectified voltage output at the junction of the resistor 53 and the diode 56 drops below the Zener voltage, a condition which occurs at the zero-crossing point of the supply voltage (FIG. 3A), the voltage drop across the resistor 62, which is in parallel with the Zener diode 57, decreases, since the diode 56 prevents the filter capacitor 58 from discharging through the resistor 62. As the voltage drop across the resistor 62 decreases, the voltage at the base of the transmitter 61 decreases until the transistor 61 conducts, permitting the capacitor 63 to discharge through the emitter-collector circuit of the transistor 61, including the resistor 66 which limits the peak discharge current therethrough.

The current through the load 11 is sensed as a voltage drop across the sensing resistor 52. This voltage is scaled by a potentiometer 91 in series with a resistor 92 across the resistor 52 and is averaged by an RC network comprising a resistor 93 and a capacitor 96. The smoothed voltage across the capacitor 96 is compared to a reference voltage appearing at the emitter of an open collector NPN transistor 97. The reference voltage includes the voltage across the reverse biased base-emitter junction of the transistor 97, which acts as a reverse-biased Zener diode, having its base connected to the base of an NPN transistor 98 and to the terminal 42 through a resistor 101, and the voltage across the forward biased base-emitter junction of the transistor 98, the emitter of which is connected to the terminal 42. The collector of the transistor 98 is connected to the base of the transistor 67 and to the capacitor 69 through a resistor 102.

The capacitor 69 is continually charged by the filter capacitor 58 through the resistor 71. When the sensed voltage exceeds the reference voltage comprising the voltages across the reverse and forward biased base-emitter junctions of the transistors 97 and 98, respectively, the transistor 98 conducts, removing some of the charge from the capacitor 69. Since the voltage across the capacitor 69 is the same as the voltage across the base-emitter junction of the transistor 67 and the resistor 68, the current thus sunk by the transistor 67 is proportional to the voltage across the capacitor 69.

As the base voltage of the transistor 67 increases, the charging rate of the capacitor 63 increases, thus controlling the firing angle of the SCRs 21 and 22 through the pulse transformer 76 as described above.

The values and identification code numbers for the components listed below are exemplary values for a constant current generator 10, which produces a d.c. average of four amperes regulated to within one per cent of its nominal value. Other values and components may be utilized as a matter of discretion and designer's choice. Resistors are rated at 0.5 watts unless otherwise indicated.

| REFERENCE NUMERAL OF COMPONENT | VALUE OR CODE NUMBER |
| --- | --- |
| 21, 22 | S4015L |
| 35–38, 56 | IN4003 |
| 57 | 20V., 400mw. |
| 61 | AST2907 |
| 67, 97, 98 | 2N5172 |
| 72 | MBS4991 |
| 52 | 3 ohms |
| 53 | 7,000 ohms, 5w. |
| 62 | 3,300 ohms |
| 66 | 4.7 ohms |
| 68 | 2,200 ohms |
| 71 | 1,000,000 ohms |
| 83, 86 | 47 ohms |
| 91 | 1000 ohms |
| 92 | 1800 ohms |
| 93 | 10,000 ohms |
| 101 | 33,000 ohms |
| 102 | 4700 ohms |
| 58 | 100 microfarads, 25v. |
| 63 | .22 microfarads, 16v. |
| 69 | 33 microfarads, 10v. |
| 96 | 10 microfarads, 6v. |

If the power supply 17 is to be obtained from an electric utility, it is preferred that it be coupled to the input of the circuit 10 through a transient voltage protected transformer.

Additionally, the SBS 72 may be replaced by a silicon unidirectional switch (SUS) without affecting the operation of the circuit as shown and described.

Although the circuit 10 is particularly suitable for use in a battery charging system to charge a single string of batteries, it may be incorporated into other battery charging schemes, for example, the system disclosed in copending application Ser. No. 571,535 filed on even date herewith. It will be appreciated that various other arrangements and components of the circuit will be obvious to those having ordinary skill in the art which will embody the principles of the invention without departing from spirit and scope thereof.

What is claimed is:

1. A circuit for supplying a constant charging current to a battery load which comprises:
    first and second terminals for connecting to an AC source;
    third and fourth terminals for connecting to the load;
    full wave rectifier means connected across said first and second terminals;
    first and second controlled switching devices, each having first and second power electrodes and a control electrode, said first and second controlled switching devices being connected with their power electrodes in series opposition across said first and second terminals, wherein said controlled switching devices are alternately forward biased during successive half cycles of the source voltage;
    means connecting said third terminal between said first and second controlled switching devices;
    means for connecting resistance means between said fourth terminal and said full wave rectifier means for developing a first voltage proportional to the current through the load;
    means coupled to said full wave rectifier means for developing a predetermined second voltage;
    a charging capacitor;
    means coupling said charging capacitor to the output of said full wave rectifier means to charge said capacitor;
    a pulse transformer having a primary winding and first and second secondary windings;
    means connecting said first and second secondary windings of said pulse transformer between the control electrode and the second power electrode of said first and second controlled switching devices, respectively;
    switching means responsive to the charge on said charging capacitor reaching a predetermined level for applying a trigger pulse to said first and second secondary windings of said pulse transformer during each half cycle of source voltage;
    means for completely discharging said charging capacitor at the beginning of each half cycle of source voltage; and
    means responsive to the difference between said first and second voltages for controlling the charging rate of said charging capacitor.

2. A circuit according to claim 1 wherein said switching means includes a breakdown device coupling said primary winding of said pulse transformer to said charging capacitor for permitting said capacitor to discharge therethrough and through said primary winding of said pulse transformer when the voltage across said capacitor exceeds the breakdown voltage level of said breakdown device, said breakdown voltage level corresponding to said predetermined level.

3. A circuit according to claim 1 wherein said means for developing said second predetermined voltage includes:
    a first transistor having a collector, an emitter and a base;
    means for connecting said collector and emitter of said first transistor across the output of said full wave rectifier means;
    a second transistor having a collector an emitter, and a base; and
    means connecting the base-emitter junction of said first transistor in series with the base-emitter junction of said second transistor for reverse biasing the base-emitter junction of said second transistor and for forward biasing the base-emitter junction of said first transistor to establish said second predetermined voltage as the sum of said reverse and forward biased junctions.

4. A circuit according to claim 3 wherein said means for controlling the charging rate of said charging capacitor includes:
    means coupling the voltage across the series resistance means across the forward and reversed biased junctions of said first and second transistors;
    a third transistor having a collector, and emitter and a base;
    means connecting the collector of said third transistor to said charging capacitor;
    means connecting the base-emitter junction of said third transistor across the collector-emitter junction of said first transistor; and
    a second capacitor connected across the collector-emitter junction of said first transistor for controlling the current through said third transistor to control the charging rate of said charging capacitor.

5. A circuit according to claim 4 wherein said means for discharging said capacitor at the beginning of each halfcycle of source voltage includes a fourth transistor having a collector, an emitter, and a base;
  means connecting the collector-emitter junction of said fourth transistor across said charging capacitor; and
  means connecting the base of said fourth transistor to the output of said full wave rectifier means for rendering said transistor conductive prior to each half-cycle of source voltage to discharge said charging capacitor through said fourth transistor at the beginning of each half-cycle of source voltage.

6. A circuit according to claim 5 wherein said means connecting said base of said fourth transistor to the output of said full wave rectifier means includes:
  reversed biased Zener diode means connected across the output of said full wave rectifier means;
  resistance means connected across said Zener diode means;
  forward biased diode means connecting said reversed biased Zener diode means to the emitter of said fourth transistor; and
  third capacitance means connected across said forward biased diode means and said Zener diode means.

7. A regulating circuit comprising:
  first and second terminals for connecting an AC source;
  full wave rectifier means connected across said first and second terminals;
  first and second controlled switching devices, each having first and second power electrodes and a control electrode, said first and second controlled switching devices being connected with their power electrodes in series opposition across said first and second terminals, wherein said controlled switching devices are alternately forward biased during successive half cycles of the source voltage;
  a sensing resistor;
  means connecting a first end of said sensing resistor to a junction between said first and second controlled switching devices;
  means connecting the second end of said sensing resistor to said full wave rectifier means;
  scaling means connected across said sensing resistor for developing a first voltage which is a function of the voltage across said sensing resistor;
  means coupled to said full wave rectifier means for developing a predetermined second voltage;
  a charging capacitor;
  means coupling said charging capacitor to the output of said full wave rectifier means to charge said capacitor;
  a pulse transformer having a primary winding and first and second secondary windings;
  means connecting said first and second secondary windings of said pulse transformer between the control electrode and the second power electrode of said first and second controlled switching devices, respectively;
  switching means responsive to the charge on said charging capacitor reaching a predetermined level for applying a trigger pulse to said first and second secondary windings of said pulse transformer during each half cycle of source voltage;
  means responsive to the difference between said first and second voltages for controlling the charging rate of said charging capacitor; and
  means for completely discharging said charging capacitor at the beginning of each half cycle of source voltage.

8. A circuit for supplying a constant charging current to a battery load which comprises:
  first and second terminals for connecting to an a.c. source;
  third and fourth terminals for connecting to the load;
  full wave rectifier means connected across said first and second terminals;
  first and second controlled switching devices, each having first and second power electrodes and a control electrode, said first and second control switching devices being connected with their power electrodes in series opposition across said first and second terminals whereby said controlled switching devices are alternately forward biased during successive half-cycles of source voltage;
  means connecting said third terminal between said first and second controlled switching devices;
  means for connecting resistance means between said fourth terminal and said full wave rectifier means for developing a first voltage proportional to the current through the load;
  first transistor means having a collector, an emitter and a base;
  means connecting the collector-emitter junction of said first transistor across the output of said full wave rectifier means;
  a second transistor having a collector, an emitter, and a base;
  means connecting the base-emitter junction of said second transistor in series with the base-emitter junction of said first transistor to forward and reverse bias the base-emitter junctions of said first and second transistors, respectively, to establish a second predetermined voltage as the sum of the voltages across said forward and reverse biased junctions;
  means coupling the voltage across said resistance means to the emitter of said second transistor;
  a charging capacitor;
  third transistor means having a collector, an emitter and a base;
  means connecting the collector emitter junction of said third transistor across the output of said full wave rectifier means through said charging capacitor;
  means connecting the collector-emitter junction of said first transistor across the base-emitter junction of said third transistor to control the charging rate of said charging capacitor in accordance with the difference of said first and second voltages;
  a pulse transformer having a primary winding and first and second secondary windings;
  means connecting said first and second secondary windings of said pulse transformer across said control electrode and said second power electrode of said first and second controlled switching devices, respectively;
  breakdown switching means connecting said primary winding of said pulse transformer across said charging capacitor, for discharging said charging capacitor through said primary winding of said pulse transformer when the charge on said capacitor exceeds the breakdown voltage level of said breakdown switching means to apply trigger pulses to said controlled switching devices during each half-cycle of source voltage to trigger said forward biased one of said controlled switching devices during each said half-cycle; and means for completely dischargiing said capacitor prior to each half-cycle of applied voltage.

9. A circuit according to claim 8 wherein said means coupling the voltage across the resistance means to the second transistor includes adjustable voltage divider means connected across said fourth terminal and said full wave rectifier means and an R-C network connecting the emitter of said second transistor to said voltage divider means to average the voltage output of said voltage divider means.

* * * * *